(12) United States Patent
Beal et al.

(10) Patent No.: US 9,147,054 B1
(45) Date of Patent: Sep. 29, 2015

(54) DIALOGUE-DRIVEN USER SECURITY LEVELS

(71) Applicant: Rawles LLC, Wilmington, DE (US)

(72) Inventors: Jeff Bradley Beal, Edgewood, WA (US); Robert David Owen, Sammamish, WA (US); John Daniel Thimsen, Seattle, WA (US); Sumedha Arvind Kshirsagar, Seattle, WA (US)

(73) Assignee: Amazon Technolgies, Inc., Seattle, WA (US)

( * ) Notice: Subject to any disclaimer, the term of this patent is extended or adjusted under 35 U.S.C. 154(b) by 237 days.

(21) Appl. No.: 13/720,713

(22) Filed: Dec. 19, 2012

(51) Int. Cl.
*G06F 21/31* (2013.01)
*G06F 21/32* (2013.01)

(52) U.S. Cl.
CPC ............... *G06F 21/31* (2013.01); *G06F 21/32* (2013.01)

(58) Field of Classification Search
CPC .................................. G06F 21/31; G06F 21/32
USPC ............................................................ 726/5
See application file for complete search history.

(56) References Cited

U.S. PATENT DOCUMENTS

| 7,418,392 | B1 | 8/2008 | Mozer et al. | |
|---|---|---|---|---|
| 7,720,683 | B1 | 5/2010 | Vermeulen et al. | |
| 7,774,204 | B2 | 8/2010 | Mozer et al. | |
| 2009/0043580 | A1* | 2/2009 | Mozer et al. | 704/251 |
| 2009/0204408 | A1* | 8/2009 | Simpson et al. | 704/273 |
| 2012/0166203 | A1* | 6/2012 | Fuchs et al. | 704/275 |
| 2012/0223885 | A1 | 9/2012 | Perez | |
| 2014/0129232 | A1* | 5/2014 | Jones et al. | 704/275 |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Kambiz Zand
*Assistant Examiner* — Benjamin Kaplan
(74) *Attorney, Agent, or Firm* — Lee & Hayes, PLLC

(57) ABSTRACT

Natural language controlled devices may be implemented in an environment where the devices are configured to operate with multiple different users. The techniques described herein implement security requirements for a device configured to operate in an environment where the multiple different users may request functionality. The security requirements may be implemented based on the whether the functionality requested is personal and/or secured.

28 Claims, 7 Drawing Sheets

DIALOGUE-DRIVEN USER SECURITY LEVELS

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech.

The use of natural language input to interact with computing devices presents many challenges. One challenge concerns recognizing and/or authenticating a user interacting with the computing device. For example, when the computing device is placed in an environment where it is configured to interact with a plurality of users, the computing device may need to know which particular user is requesting functionality to be performed by the computing device.

Accordingly, there is a need for techniques to recognize and/or authenticate one or more users that may interact with natural language control devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
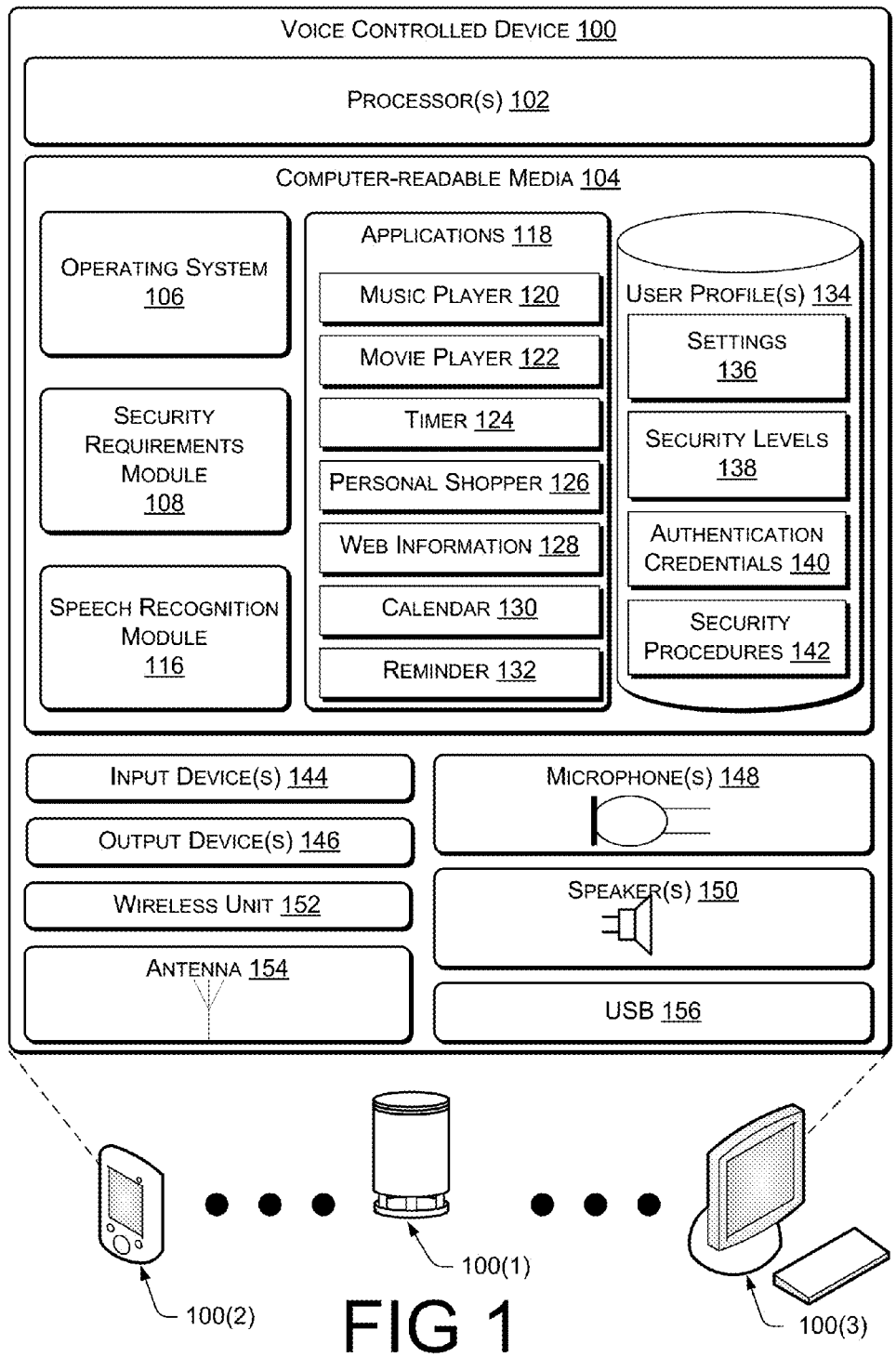
FIG. 1 shows a functional block diagram of selected components implemented at a voice controlled device.

The techniques and systems described herein operate a voice controlled device configured to interact with a plurality of different users. The voice controlled device is configured to implement different security requirements depending on the functionality requested by a user. For example, the functionality requested by a user may be non-personalized and unsecured functionality that the voice controlled device can perform independent of user identification. Alternatively, the functionality requested by a user may be personalized but unsecured functionality that the voice controlled device can perform once the user is identified (e.g., after the user provides a name). Or, in another alternative, the functionality requested by a user may be secured functionality that involves restricted operations and/or confidential information. In this last alternative, the voice controlled device may be configured to perform the secured functionality after the user is authenticated (e.g., after the user provides authentication credentials and the voice controlled device validates the authentication credentials).

In various embodiments, the voice controlled device may be located in an environment where the plurality of different users commonly reside, frequently visit, etc. For example, the voice controlled device may be located in a household environment, a business office environment, an educational setting, and so forth.

Conventionally, a user may have to sit down at a household computer and identify oneself by providing, via a mechanical input device and a display interface, user identification (ID) and a password before the user can use the household computer. Moreover, the user may often have to type additional user IDs and passwords to log into and to use specific applications executing on the household computer (e.g., email, e-commerce purchases, etc.).

However, in systems that employ natural language techniques to interact with multiple different users, a voice controlled device may not be able to identify and/or authenticate a user by employing the conventional approaches where a user sits down at a household computer and uses a mechanical input device to provide user identification and a user password.

The techniques described herein determine whether any unsatisfied security requirements are associated with requested functionality and then implement processes to determine and acquire the unsatisfied security requirements if a user requesting the functionality has not already satisfied the security requirements. In various embodiments, execution of the requested functionality by the voice controlled device may be implemented in accordance with different operating modes that may correspond to the security requirements. The different operating modes may define one or more types of functionality capable of being performed by the voice controlled device. As described herein, functionality performed by the voice controlled device may include, but is not limited to, operations, actions, routines, information retrieval (e.g., via local datastores, via connected networks) and/or any other functionality associated with an application, computer program, or instructions executing on the voice controlled device.

In various embodiments, the voice controlled device may not require user identification or user authentication when the functionality requested is non-personal and the functionality is unsecured functionality (e.g., the functionality is common to a group of users and therefore no security requirements must be satisfied in association with the request). Here, the voice controlled device may operate in an unrecognized mode when the functionality requested involves non-personal and unsecured information (e.g., the weather) and the user requesting the functionality has not already been identified and/or authenticated. In this scenario, the voice controlled device may not know, or need to know, which one of a plurality of different users is speaking (i.e., a user may be "unrecognized" or not yet identified).

In various embodiments, the voice controlled device may require user identification as a security requirement when the functionality requested is personal to a user, but the functionality is unsecured (e.g., outputting a personal music playlist compiled by a user may be personal but unsecured). Here, the voice controlled device may operate in a recognized mode that involves identifying the user so that the personal functionality can be executed.

As discussed herein, secured functionality may include restricted operations that can only be performed by certain users, or operations where security (e.g., authentication) is implemented to help protect the functionality from deceptive or fraudulent actions by someone not authorized to request the functionality (e.g., someone who falsely claims to be a different person). Secured functionality may also involve (e.g., access, provide, disclose, use, update, etc.) confidential information that includes information that is sensitive to a user, and therefore, the user may not want the information shared or revealed to others (e.g., social security number, credit card numbers, health information, etc.). Thus, secured functionality depends on and may vary in accordance with the operations being executed and/or a type of information involved in the operations. Moreover, functionality may be classified as secured according to an indication from an application or an indication from a user.

In various embodiments, the voice controlled device may require user authentication as a security requirement when the functionality requested is secured functionality (e.g., making a purchase using an online shopping account with a registered credit card). Here, the voice controlled device may operate in an authenticated mode that involves authenticating the user requesting the functionality.

In scenarios where the functionality is secured functionality, the voice controlled device is configured to establish a higher confidence and a stronger likelihood that the user is who he/she claims to be when interacting with the voice controlled device. Accordingly, in the authenticated mode, the voice controlled device may be configured to request and/or receive authentication credentials to verify the user making the request. The voice controlled device may be configured with different levels of security when operating in the authenticated mode. Moreover, the voice control device may be configured to request and/or receive the authentication credentials using different forms of communication.

While this disclosure further describes systems, devices, and processes associated with determining whether user identification or user authentication is required for security purposes, it is understood in the context of this document that the voice controlled device may be configured to acquire other information for security purposes. Moreover, the voice controlled device may be configured to operate in any number of different identification modes that may create an improved user natural language experience while also protecting secured functionality and confidential information.

Illustrative Device

FIG. 1 shows selected functional components of a natural language input controlled device, specifically, voice controlled device 100. The voice controlled device 100 may be implemented as a standalone voice controlled device 100(1) that is relatively simple in terms of functional capabilities with limited input/output components, memory, and processing capabilities. For instance, the voice controlled device 100(1) does not have a keyboard, keypad, or other form of mechanical input. Nor does it have a display or touch screen to facilitate visual presentation and user touch input. Instead, the voice controlled device 100(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the voice controlled device 100(1) is through voice input and audible output.

The voice controlled device 100 may also be implemented as a mobile device 100(2) such as a smart phone or personal digital assistant. The mobile device 100(2) may include a touch-sensitive display screen and various buttons for providing input as well as additional functionality such as the ability to send and receive telephone calls. Alternative implementations of the voice control device 100 may also include configuration as a personal computer 100(3). The personal computer 100(3) may include a keyboard, a mouse, a display screen, and any other hardware or functionality that is typically found on a desktop, notebook, netbook, or other personal computing devices. The devices 100(1), 100(2), and 100(3) are merely examples and not intended to be limiting, as the techniques described in this disclosure may be used in essentially any device that has an ability to recognize speech input.

In the illustrated implementation, the voice controlled device 100 includes one or more processors 102 and computer-readable media 104. The computer-readable media 104 may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, redundant array of independent disks ("RAID") storage systems, or any other medium which can be used to store the desired information and which can be accessed by a computing device. The computer-readable media 104 may be implemented as computer-readable storage media ("CRSM"), which may be any available physical media accessible by the processor(s) 102 to execute instructions stored on the memory 104. In one basic implementation, CRSM RAM and Flash memory. In other implementations, CRSM may include, but is not limited to, ROM, EEPROM, or any other tangible medium which can be used to store the desired information and which can be accessed by the processor(s) 102.

Several modules such as instruction, datastores, and so forth may be stored within the computer-readable media 104 and configured to execute on the processor(s) 102. A few example functional modules are shown as applications stored in the computer-readable media 104 and executed on the processor(s) 102, although the same functionality may alternatively be implemented in hardware, firmware, or as a system on a chip (SOC).

An operating system module 106 may be configured to manage hardware and services within and coupled to the voice controlled device 100 for the benefit of other modules. A security requirements module 108 may be configured to determine security requirements that must be satisfied before the voice controlled device 100 can execute functionality corresponding to requests made by one or more users.

In some embodiments, the security requirements module 108 may determine that the voice controlled device 100 can perform functionality independent of whether or not the voice controlled device 100 identifies the user (e.g., the voice controlled device 100 may operate in the unrecognized mode when the voice controlled device 100 does not have to know the identification of the user). In another example, the security requirements module 108 may determine that the voice controlled device 100 is required to identify a user requesting the functionality before performing the functionality because the functionality is personal to the user, but the functionality is unsecured (e.g., the voice controlled device 100 may operate in the recognized mode). In yet another example, the security requirements module 108 may determine that the voice controlled device 100 is required to authenticate a user requesting the functionality before performing the functionality because the functionality is secured, and therefore, the user must provide authentication (e.g., the voice controlled device 100 may operate in the authenticated mode where the user is verified via the use of authentication credentials).

The security requirements module 108 may determine that no security requirements must be satisfied when the functionality requested is common to a group of users and the functionality is unsecured. If this determination is made, the voice controlled device 100 may operate in the unrecognized mode. For example, the voice controlled device 100 may determine that no security requirements must be satisfied when the functionality requested is public and/or anonymous. Examples of public and/or anonymous functionality may include, but are not limited to, accessing non-personal web information (e.g., weather, traffic patterns, news headlines, price checks, stock quotes, web searches, etc.), accessing non-personal information via local systems (e.g., electronic program guide information including television programs currently being broadcast), playing non-personalized music (e.g., radio, Internet radio, web-based music players, etc.), playing movies, general timing and calendar information (e.g., setting a timer, time of day, day of the week, month, Holidays, etc.), and so forth. Accordingly, any one of a plurality of users registered with the voice controlled device 100 or even a guest visiting an environment where the voice controlled device 100 is physically located may be able to ask what the weather outside is and the voice controlled device may be configured to provide an answer without identifying or authenticating the user or a guest.

The security requirements module 108 may determine that user identification is required when the functionality requested by a user is personal to the user, but the functionality does not involve secured functionality and/or confidential information. If this determination is made, the voice controlled device 100 may operate in the recognized mode. For example, the voice controlled device 100 may require user identification when a user requests that the voice controlled device 100 play a personal music playlist, output a personalized reminder (e.g., a calendar appointment), requesting information about email received in a user's account, post a comment to a newsfeed (e.g., social network, chat group, etc.), and so forth. Accordingly, the voice controlled device 100 may implement a process to identify the particular user so that the appropriate music playlist or reminder can be output, or the post can be provided to the newsfeed and attributed to the correct person. Other examples of personalized, but not secured, content may include tailored recommendations or web information based on user interests (e.g., stock quote watch-list, favorite sports teams scores/news, favorite retail store sales or coupons, etc.), a privilege of adding items to a personal shopping cart but not completing the purchase of the items, and so forth.

In at least one embodiment, a process implemented by the voice controlled device 100 to identify the user may include prompting the user to say a name or other form of identification registered at the voice controlled device 100. In this embodiment, since the functionality is unsecured functionality, the voice controlled device 100 will "trust" that the user is who he/she claims to be without validating the user via the use of authentication credentials. In at least one alternative embodiment, the process implemented by the voice controlled device 100 to identify the user in conjunction with the recognized mode may include recognizing the voice of the user using a stored voiceprint-based form of identification. The voiceprint-based form of identification may be learned and/or trained over a period of time by building a voice profile for each user (e.g., using enrollment scripts or a known set of utterances), such that the voice controlled device 100 can recognize different users with acceptable confidence. Depending on a level of identification confidence using voice-print based forms of identification, and as the level of identification confidence increases, voice-print based forms of identification may also be used for user authentication purposes.

The security requirements module 108 may determine that user authentication is required when the functionality requested is secured functionality (e.g., involves restricted operations and/or confidential information). If this determination is made, the voice controlled device 100 may operate in an authenticated mode. Accordingly, the voice controlled device 100 may be configured to request and/or receive authentication credentials to verify that the user making the request for the secured functionality is who he/she claims to be. Examples of secured functionality may include, but are not limited to, a user making a purchase via an online shopping account, private or confidential reminders (e.g., doctor's appointment, surprise birthday party), applications that use, request, or provide sensitive information (e.g., bank account numbers, credit card numbers, social security numbers, health information, social security numbers, etc.), and sending an email from a user's email account.

In various embodiments, the voice controlled device 100 may be set to a default configuration that defines whether or not security requirements must be satisfied before performing different types of functionality and/or an operating mode associated with different types of functionality. As further discussed herein, the default configuration may be subjected to i) settings defined by a primary account holder for different individuals associated with the account, and/or ii) application settings that recommend security requirements and/or that enforce a particular operating mode to be implemented to preserve security (e.g., a banking application that requires user authentication and the authenticated mode).

The voice controlled device 100 may process the functionality request with a speech recognition module 116 that may employ any number of conventional speech recognition techniques such as use of natural language processing and extensive lexicons to interpret voice input. The speech recognition module 116 may initially be in a passive state in which the speech recognition module 116 is waiting for speech input requesting functionality to be performed. Upon receiving the request, the speech recognition module 116 may enter an active state in which the security requirements module 108 determines whether user identification or user authentication is required for the requested functionality. In at least one embodiment, the voice controlled device 100 may initially wake up and operate in the unrecognized mode. The security requirements module 108 may then determine that user identification or user authentication is required for the requested functionality. Accordingly, the security requirements module 108 may implement processes to request and acquire user identification information or user authentication information.

To perform the example functionality provided above, the voice controlled device 100 may include a plurality of applications 118 stored in the computer-readable media 104 or otherwise accessible to the voice controlled device 100. For example, the applications 118 may include a music player application 120, a movie player application 122, a timer application 124, a personal shopper application 126, web information application 128, a calendar application 130, and a reminder application 132, and so forth. However, the voice controlled device 100 may include any number or type of applications and is not limited to the specific examples shown here.

The music player application 120 may be configured to play songs or other audio files. The movie player application 122 may be configured to play movies or other audio visual media. The timer application 124 may be configured to provide the functions of a simple timing device and clock. The personal shopper application 126 may be configured to assist a user in purchasing items from web-based merchants. The web information application 128 may be configured to fetch web information for a user (e.g., weather, news, stock quotes, web searches, price checks). The calendar application 130 may be configured to store non-personal, personal, unsecured, and secured calendar information (e.g., days, months, personal schedules, meetings, vacations, deadlines, confidential appointments, etc.). The reminder application 132 may be configured to set and provide reminders (e.g., exact time, daily, weekly, etc.) for a group of users or for an individual user (e.g., television program start times, errands, appointments, pick up kids, pay bills, garbage day, etc.). In at least one embodiment, the reminder application 132 may access information maintained by the calendar application 130 to determine reminders, and electronically communicate the reminders to a mobile device associated with the user.

In various embodiments, the voice controlled device 100 may also include applications and/or application programming interfaces ("API") that access information and use functionality of other systems (e.g., set top boxes, digital video recorders "DVR", social network systems, email systems, etc.).

In various embodiments, datastores present may include an account information database with one or more user profiles 134. The account information database may be associated with a service provider or a content provider. Each of the user profiles 134 may be associated with a registered user who interacts with the voice controlled device 100. For example, when the voice controlled device 100 is set in a household environment, each of the user profiles 134 may be associated with a member of a family (e.g., a parent, a child, a grandmother or a grandfather, etc.). The user profile(s) 134 may include user characteristics (e.g., age, sex), personal preferences or interests (e.g., music, movies, television programs, books, sports teams, topics, etc.), a device usage history, library information (e.g., music play lists, ebooks), online purchase history, and other information specific to an individual user.

In various embodiments, the user profiles 134 may also include settings 136, security levels 138, authentication credentials 140 and security procedures 142.

The settings 136 define information that the security requirements module 108 may access when determining whether user identification or user authentication is required for a particular functionality. In some implementations, a primary account holder (e.g., a parent of the household, a manager of an office) or other account manager or user with privileges may define whether user identification or user authentication is required when a user requests a particular functionality. The settings 136 may define that particular security requirements are associated with an individual user or a group of users when any one of the users in the group requests a particular functionality (e.g., teenagers, group based on status of employee).

For example, a primary account holder may define, in the settings 136, that the voice controlled device 100 require user authentication and/or operate in the authenticated mode when a dependent (e.g., child, employee) requests online purchasing functionality. In another example, the primary account holder may define that anyone can request functionality by a particular application 118 by defining that the voice controlled device 100 can perform the functionality in the unrecognized mode without user identification or user authentication.

In various embodiments, a primary account holder may also define, in the settings 136, restricted operations for functionality performed by a particular application 118. Restricted operations may include a complete prohibition of a particular functionality (e.g., children may never make an online purchase), time constrained privileges (e.g., children may be limited to use of a social network application on the weekends and not on school nights), purchase limits (e.g., total dollar amount limit for a one time purchase, total dollar amount limit for a defined period, frequency of a purchase, acceptable times for a purchase, etc.). The restricted operations defined in the settings 136 may be performed in the authenticated mode after the user has provided authentication credentials, or they may be performed in the recognized mode after the user has been identified.

The security levels 138 may define different degrees of authentication associated with requested functionality when the security requirements module 108 determines that user authentication is required. Thus, the security requirements module 108 may access the security levels 138 when implementing a user authentication process. For example, depending on the operations performed (e.g., a small dollar amount purchase of a book vs. a large dollar amount purchase of a set of concert tickets) or a degree of sensitivity for the information involved (e.g., a personal email message vs. a credit card number or a social security number) involved for a particular functionality, the voice controlled device 100 may implement different security levels 138 so the voice controlled device 100 is confident that the user making the request is who they claim to be when requesting functionality that may be more secure. For example, a first security level for sending an email from an account may require a four digit access code, while a second security level associated with purchasing an expensive product with a credit card may require a more secure code, such as a four digit access code as well as an additional purchase code. In this example, use of the purchase code may be restricted (e.g., only the primary account holder knows the purchase code) and it may change every two weeks, for example. Accordingly, similar to the settings 136, a primary account holder or other account manager may set different security levels 138 for different functionality performed by the applications 118 on the voice controlled device 100.

The authentication credentials 140 may include personal passwords, codes, personal identification numbers ("PIN"), question/answer combinations (e.g., maiden name, favorite childhood pet, etc.), redemption codes, key fob, a series of tones, or any type of security mechanism used to authenticate individual users. The authentication credentials 140 may be defined for each user so that they may be used for a period of time, or they may be randomly generated and used for one time authentication. For example, the authentication credentials 140 may be a combination of letters, numbers, symbols, words, phrases, sounds, and so forth. In at least one embodiment, the authentication credentials 140 may include an element based on voiceprinting, as previously mentioned. The authentication credentials 140 may be set up and defined by a primary account holder or the individual user during a registration process, as further discussed herein.

In various embodiments, the voice controlled device 100 may be configured to request and/or receive the authentication credentials 140 for each of the multiple users registered according to different security procedures 142. For instance, the security procedures 142 for a user may be configured to request and/or receive authentication credentials 140 using the natural language speech previously discussed. Alternatively, the security procedures 142 may be others forms of communications that may be implemented to better protect the authentication credentials 140 such that a user does not have to uncomfortably disclose the authentication credentials 140 out loud when others may be present in a room. For example, a user may be able to electronically provide authentication credentials 140 using a personal device configured with a companion application that communicates with the voice controlled device 100. Thus, the user may be able to enter (e.g., silently via key input) the authentication credentials 140 at the personal device using the companion application and the personal device may then be configured to electronically send the authentication credentials 140 to the voice controlled device 100 for validation. In another example, the voice controlled device 100 may be configured to send an authentication redemption code (e.g., a set code, a randomly generated code) to the companion application installed on a registered personal device associated with a registered user requesting particular functionality (e.g., purchase a product), and the user may then be able to redeem the authentication redemption code. In yet another example, when a registered user knows that the functionality he/she wants to request is secured functionality, the registered user may proactively press, on the personal device, an authentication key or a series of authentication keys associated with the companion application to instruct the voice controlled device 100 to enter the authenticated identification mode.

Moreover, the companion application executing on the personal device associated with the user may be configured to play out a series of tones that the voice controlled device 100 can to hear and process for validation purposes. In order to protect the series of tones from being copied, the series of tones may be outside of a human auditory spectrum, the series of tones may be embedded in other audio (e.g., music), or the series of tones may change frequency.

In various embodiments, a developer of an application 118 may provide an indication of recommended or required security requirements (e.g., the user must identify or authenticate himself or herself). This may occur when the application 118 is installed on the voice controlled device 100 and/or registered with an account. For example, an application 118 that performs secured functionality with confidential information may recommend or require that the voice controlled device 100 acquire user authentication (e.g., in the authenticated mode) before executing functionality. In another example, an application 118 that may acquire, access, or develop personalized, but what the developer may consider as unsecured content may recommend that the voice controlled device 100 acquire user identification (e.g., in the recognized mode). In yet another example, an application 118 that access or provides the same common, public information regardless of the user requesting the information may recommend that the voice controlled device 100 operate in the unrecognized mode without requiring the user to identify or authenticate himself or herself.

Thus, in some instances, application-provided restrictions, indications, or recommendations may supplement, override, or build-on the settings 136 defined by a user. An application 118 may also enforce a particular security level 138 to help ensure that the secured functionality and the confidential information are protected. Consequently, the security requirements module 108 may determine whether user identification or user authentication is required based on a default configuration, user-provided settings, application-provided settings, or a combination thereof.

In various embodiments, the voice controlled device 100 has input devices 144 and output devices 146. The input devices 144 may include a keyboard, keypad, mouse, touch screen, joystick, control buttons, etc. Specifically, one or more microphones 148 may function as input devices to receive audio input, such as user voice input. The output devices 146 may include a display, a light element (e.g., LED), a vibrator to create haptic sensations, or the like. Specifically, one a more speakers 150 may function as output devices to output audio sounds.

A user may interact with the voice controlled device 100 by speaking to it, and the microphone 148 captures the user's speech. The voice controlled device 100 can communicate back to the user by emitting audible statements through the speakers 150. In this manner, the user can interact with the voice controlled device 100 solely through speech, without use of a keyboard or display.

The voice controlled device 100 might further include a wireless unit 152 coupled to an antenna 154 to facilitate a wireless connection to a network. The wireless unit 152 may implement one or more of various wireless technologies, such as Wi-Fi, Bluetooth, RF, and so on. A USB 156 port may further be provided as part of the voice controlled device 100 to facilitate a wired connection to a network, or a plug-in network device that communicates with other wireless networks. In addition to the USB 156 port, or as an alternative thereto, other forms of wired connections may be employed, such as a broadband connection.

Accordingly, when implemented as the primarily-voice-operated device 100(1), there may be no input devices, such as navigation buttons, keypads, joysticks, keyboards, touch screens, and the like other than the microphone(s) 148. Further, there may be no output such as a display for text or graphical output. Rather, the speaker(s) 150 may be the main output device. In one implementation, the voice controlled device 100(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the voice controlled device 100(1) may be implemented as an aesthetically appealing device with smooth and rounded surfaces, with one or more apertures for passage of sound waves. The voice controlled device 100(1) may merely have a power cord and optionally a wired interface (e.g., broadband, USB, etc.). Once plugged in, the voice controlled device 100(1) may automatically self-configure, or with slight aid of a user, and be ready to use. As a result, the voice controlled device 100(1) may be generally produced at a low cost. In other implementations, other I/O components may be added to this basic model, such as specialty buttons, a keypad, display, and the like.

Figure 2:
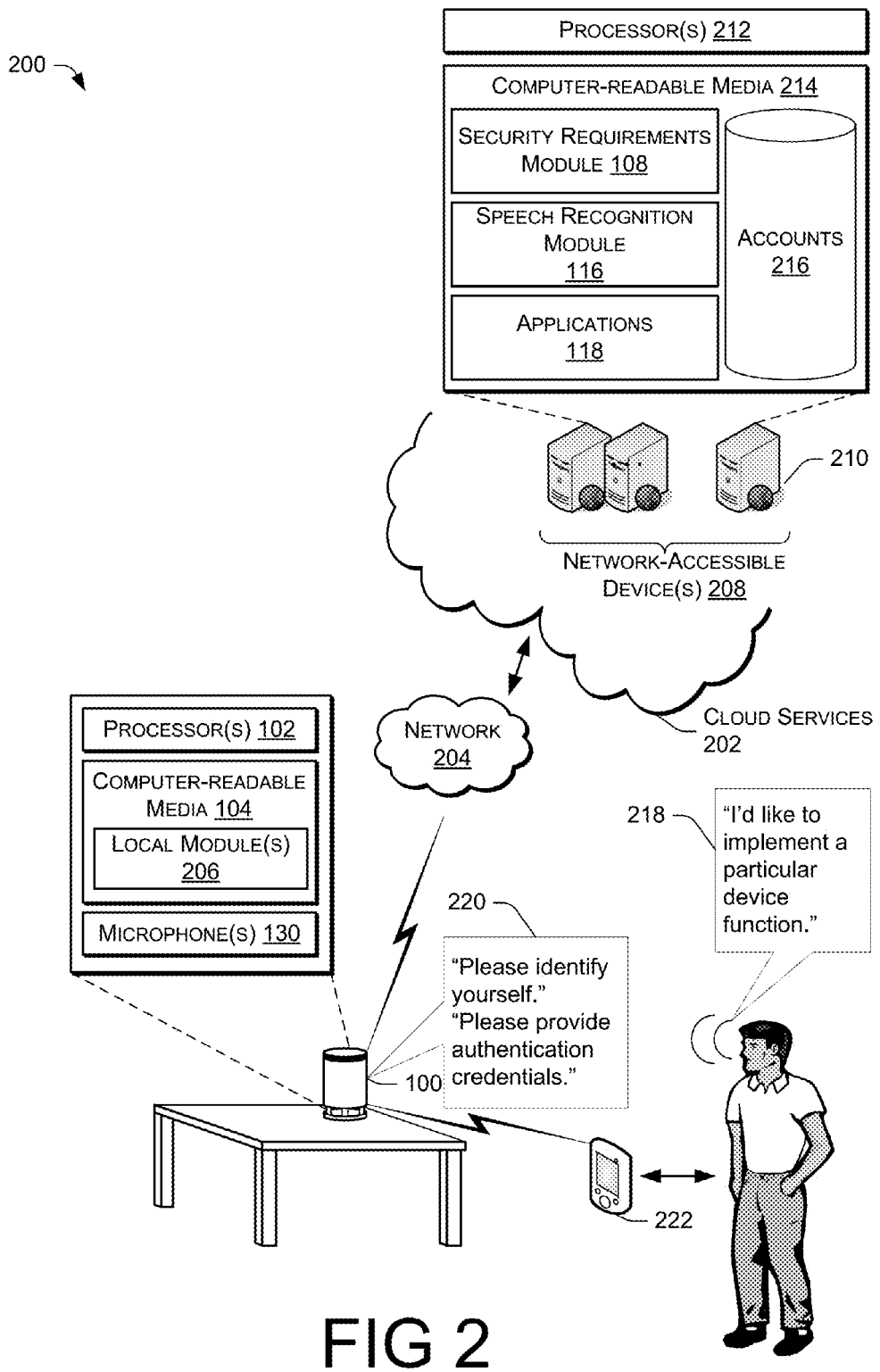
FIG. 2 shows a functional block diagram of selected components implemented at remote cloud services accessible via a network.

FIG. 2 is a system architecture 200 showing an alternative implementation of the voice controlled device 100 in which some or all of the functional components of the voice controlled device 100 may be provided by cloud services 202. The cloud services 202 generally refer to a network accessible platform implemented as a computing infrastructure of processors, storage, software, data access, and so forth that is maintained and accessible via a network 204 such as the Internet. Cloud services 202 may not require end-user knowledge of the physical location and configuration of the system that delivers the services. Common expressions associated with cloud services include "on-demand computing", "software as a service (SaaS)", "platform computing", "network accessible platform", and so forth.

In this implementation, the voice controlled device 100 may be configured with one or more local modules 206 available in the computer-readable media 104 that provide instructions to the processor(s) 102. The local modules 206 may provide basic functionality such as creating a connection to the network 204 and initial processing of data received from the microphone 148 and controlling an output device such as a speaker 150. Other functionality associated with the voice controlled device 100 described in FIG. 1 may be provided by the remote cloud services 202.

The cloud services 202 include one or more network-accessible devices 208, such as servers 210. The servers 210 may include one or more processors 212 and computer-readable media 214. The processor(s) 212 and the computer-readable media 214 of the servers 210 are physically separate from the processor(s) 102 and computer-readable media 104 of the voice controlled device 100, but may function jointly as part of a system that provides processing and memory in part on the voice controlled device 100 and in part on the cloud services 202. These servers 210 may be arranged in any number of ways, such as server farms, stacks, and the like that are commonly used in data centers.

Furthermore, the security requirements module 108, the speech recognition module 116, and/or any of the applications 118 shown in FIG. 1 may be located in the computer-readable media 214 of the cloud services 202. Thus, the specific location of the respective modules used to implement the features contained in this disclosure is not limiting and the discussions below are equally applicable to any implementation that includes a local device, a cloud-based service, or combinations thereof. In implementations in which the speech recognition module 116 is located in the computer-readable media 214 of the cloud services 202, the local modules 206 may further provide the functionality to receive functionality requests and to forward voice input to the speech recognition module 116 so that the security requirements module 108 can determine whether user identification or user authentication is required for the functionality requested by a user. Moreover, the security requirements module 108 may configure the voice controlled device 100 to operate in one of a variety of operating modes based on whether the user needs to be identified or authenticated.

In various embodiments, the servers 210 may be part of an account-based entity that provides services and/or content. Accordingly, the servers 210 may maintain account information 216. The account information 216 may be associated with a household, business office, or educational setting, as discussed above. Thus, the account information 216 may include the information stored in the user profiles 134, as well as other account information (e.g., information relating to the installment of the voice controlled device 100 the applications 118 available for use, cloud wallet account to make purchases, etc.).

As such, the operation of the system architecture 200 may be as follows. The user requests functionality 218 (e.g., "I'd like to implement a particular device function"). The security requirements module 108 at the voice controlled device 100, or in the cloud services 202, may then determine whether user identification or user authentication is required for the requested functionality. If the security requirements module 108 determines that user identification and user authentication are not required, then the voice controlled device 100 may perform the functionality without identifying or authenticating the user. Alternatively, the security requirements module 108 may instruct the voice controlled device 100 to prompt the user for identification and/or authentication credentials based on a determination that user identification or user authentication is required. As shown in the example of FIG. 2, the voice controlled device 100 may audibly output a prompt 220 requesting that the user provide further information (e.g., "Please identify yourself" or "Please provide authentication credentials").

In other embodiments, the voice controlled device 100 may request and/or receive further information via other forms of communications, such as the security procedures 142 previously discussed. In these embodiments, the user may employ a personal device 222 capable of receiving input and communicating the input to the voice controlled device 100 (e.g., a tablet computer, a smart phone, a laptop computer, a mobile phone, PDA, a personal music player, a gaming system, a desktop computer, etc.).

While FIG. 2 depicts the voice controlled device 100 prompting the user for further identification information, it is understood that the user may be aware of the security requirements associated with requested functionality. Thus, the user may proactively provide identification information or authentication information and the voice controlled device 100 will be able to process the information without having to request further information from the user. For example, the user may state "I am John and I would like to purchase movie tickets for 'An Action Film' tonight at 7:00 PM. My password is 1234." In various embodiments, the user may also utter a wake word or activation word initially, or in conjunction with the request, to wake up the voice controlled device 100.

The operations of the voice controlled device 100 in FIG. 1 and/or the system architecture 200 in FIG. 2 are described in additional detail with regard to FIGS. 3-7 below.

Illustrative Processes

The processes illustrated in FIGS. 3-7 and described herein are each a collection of blocks or actions in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 3:
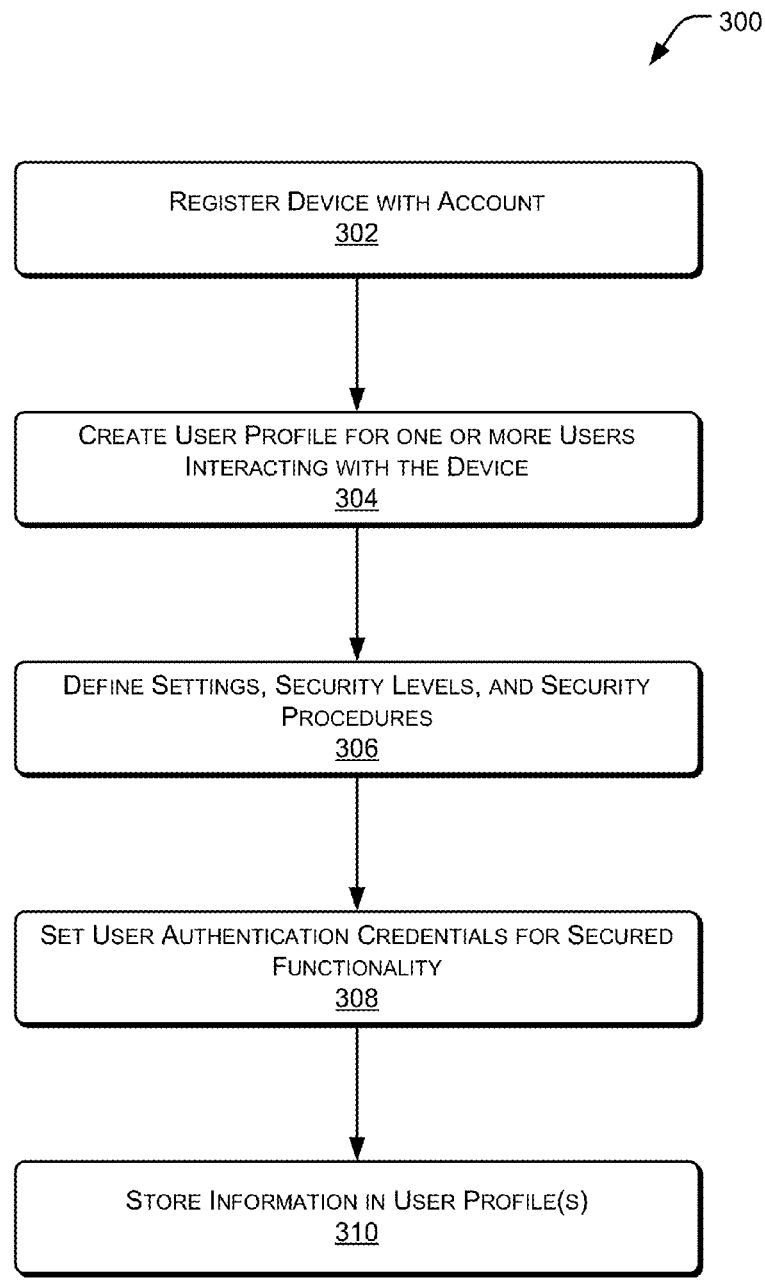
FIG. 3 shows an example process that registers one or more users with a voice controlled device.

FIG. 3 shows an example process 300 illustrating the registration of the voice controlled device 100 as well as the creation of the user profiles 134. The process 300 may be implemented by the voice controlled device 100 and server(s) 210 of FIG. 2, or by other devices. In at least one embodiment, the example process 300 may be performed when a user is interacting with voice controlled device 100. In an alternative embodiment, the user may use a separate device to log into an account and access the account information 216, register the voice controlled device 100, and provide information to create the user profiles 134.

At 302, a user (e.g., a primary account holder) may register the voice controlled device 100 with an account maintained by a service provider (e.g., cloud services 202). In various embodiments, the voice controlled device 100 may be provided to a household along with a subscription to the service provider. In other embodiments, the voice controlled device 100 may be a device marketed by and purchased from a third-party vendor. Once the voice controlled device 100 is registered, it may be configured to install applications 118 and execute the applications 118 to perform functionality for multiple different users.

At 304, the voice controlled device 100 may receive user information from a user with managing privileges (e.g., the primary account holder) and the voice controlled device 100 may create user profiles 134 for one or more users that will be interacting with the voice controlled device 100. For examples, the users may be members of a family, employees that work at a particular office branch, educational staff who use a staff room at a school, and so forth. The user information may include user characteristics, personal preferences or interests, and other information specific to an individual user.

At 306, the voice controlled device 100 may define different settings 136, security levels 138, and security procedures 142. The security requirements module 108 may access the settings 136 when determining whether user identification or user authentication is required before the voice controlled device 100 performs the requested functionality. In at least one embodiment, the voice controlled device 100 defines the settings 136 based on setting information received from a user (e.g., a primary account holder or user with privileges to define settings 136). In another embodiment, the settings 136 may also be defined in accordance with recommendation or requirements provided by a developer of an application 118. Accordingly, the settings 136 may vary based on an individual user or a group of users, the individual application 118 or a broader type or category of the application 118, a combination thereof. Furthermore, in various embodiments, the settings 136 may define restricted operations for the users. The security levels 138 may define varying degrees or strengths of authentication required for different users. In at least one embodiment, the voice controlled device 100 sets the security levels 138 based on user provided input. In another embodiment, the voice controlled device 100 sets the security levels 138 based on enforcement restrictions provided by developers of applications 118.

In some embodiments, the voice controlled device 100 sets the security procedures 142 based on user provided input (e.g., a preferred form of communication). In another embodiment, the voice controlled device 100 may set security procedures 142 based on a default configuration, or in accordance with application provided restrictions.

At 308, the voice controlled device 100 may set authentication credentials 140 for each user. A primary account holder or an individual user may create their own authentication credentials 140, or choose from a list of recommended authentication credentials 140 (e.g., an individual's birthday). As discussed above, the authentication credentials 140 may include, but are not limited to, personal passwords, codes, personal identification numbers ("PIN"), question/answer combinations (e.g., maiden name, favorite childhood pet, etc.), key fob, a series of tones, or any type of security mechanism used to authenticate individual users.

At 310, the voice controlled device 100 may store the information in the user profiles 134. The security requirements module 108 may access the various information stored in the user profiles 134 when determining whether user identification or user authentication is required in response to a request for functionality by a particular user. Moreover, the security requirements module 108 may access the information to validate the user.

Figure 4:
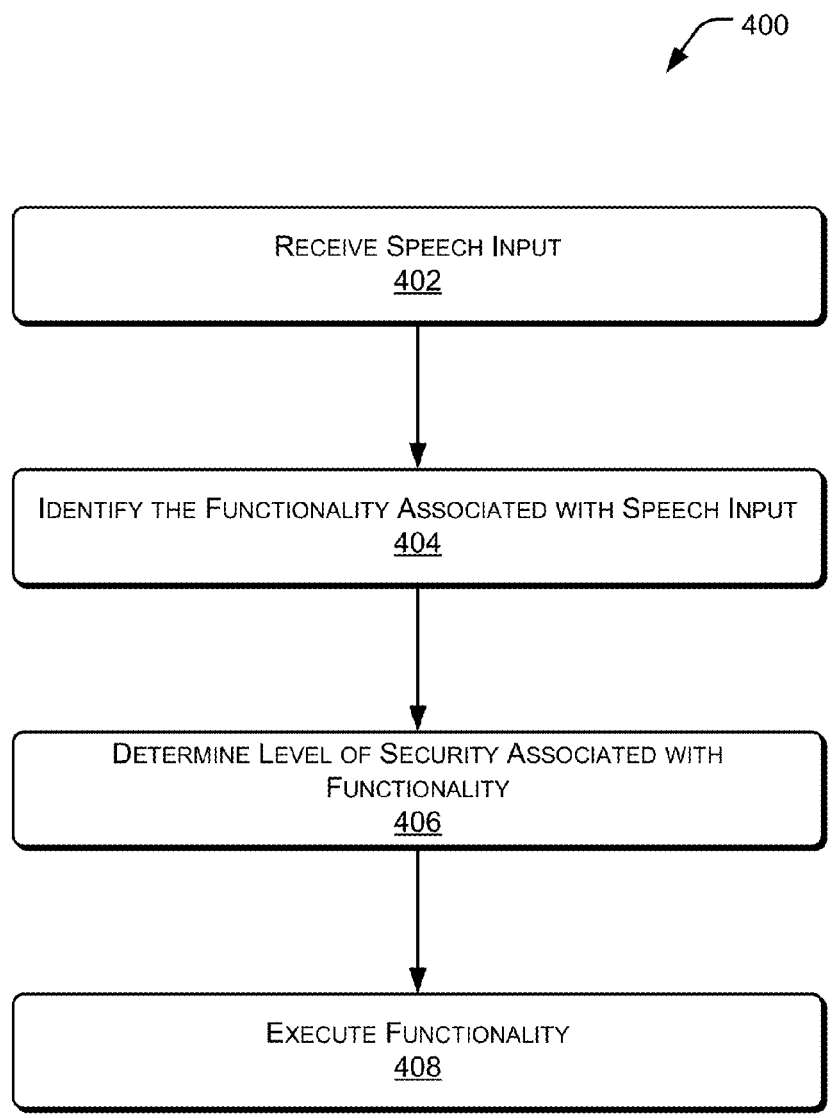
FIG. 4 shows an example process that determines an identification operating mode for functionality requested by a user.

FIG. 4 shows an example process 400 for determining security requirements for a request to the voice controlled device 100. The process 400 may be implemented by the security requirements module 108 of the voice controlled device 100 of FIG. 1, the security requirements module 108 of server(s) 210 of FIG. 2, or by other devices.

At 402, the voice controlled device 100 receives speech input. The speech input may be received by the microphones 148 and/or processed or analyzed by the speech recognition module 116. For example, a user may say one of the following:
 (i) "Please play music from Internet Radio Station A."
 (ii) "Can you please tell me the price for diapers at Web Store B."
 (iii) "This is John, please play my Christmas music playlist."
 (iv) "What are the up-to-date quotes for the stocks I own?"
 (v) "What appointments are on my schedule today?"
 (vi) "I would like to purchase a gift card as a present for the birthday this weekend."

At 404, the security requirements module 108 evaluates the speech input and identifies the functionality requested by the user. As previously discussed above, the functionality requested may be non-personal and unsecured (e.g., examples (i) and (ii) provided above), personal and unsecured (e.g., examples (iii), (iv), and non-confidential appointments or reminders of example (v) provided above), or secured functionality that involves restricted operations and/or confidential information (e.g., the confidential appointments or reminders of example (v) and example (vi) provided above).

At 406, the security requirements module 108 determines the security requirements for the requested functionality (e.g., whether user identification or user authentication is required). In some embodiments, the security requirements module 108 may identify an operation mode associated with the security requirements, and configure the voice controlled device 100 to implement a process that allows a user to satisfy the security requirements (e.g., a user identification process as further explained with respect to FIG. 5, or a user authentication process as further explained with respect to FIG. 6).

At 408, once the security requirements have been satisfied, the voice controlled device 100 executes the requested functionality provided via one or more of the applications 118.

In various embodiments, a user may configure the voice controlled device 100 to require a minimum level of security. For example, a user may define a default configuration where user identification or user authentication is always required. In another example, a user may define a default configuration where the voice controlled device 100 wakes up in the unrecognized mode and then acquires user identification or user authentication when necessary. Thus, the security requirements module 108 may transition or upgrade to higher levels of security depending on the functionality requested.

Examples (i) and (ii) provided above are examples of functionality that may be executed without acquiring user identification or user authentication because "music from Internet Radio Station A" and "the price for diapers at Web Store B" is the same for any user requesting the functionality, and in most instances this information is not secured.

Figure 5:
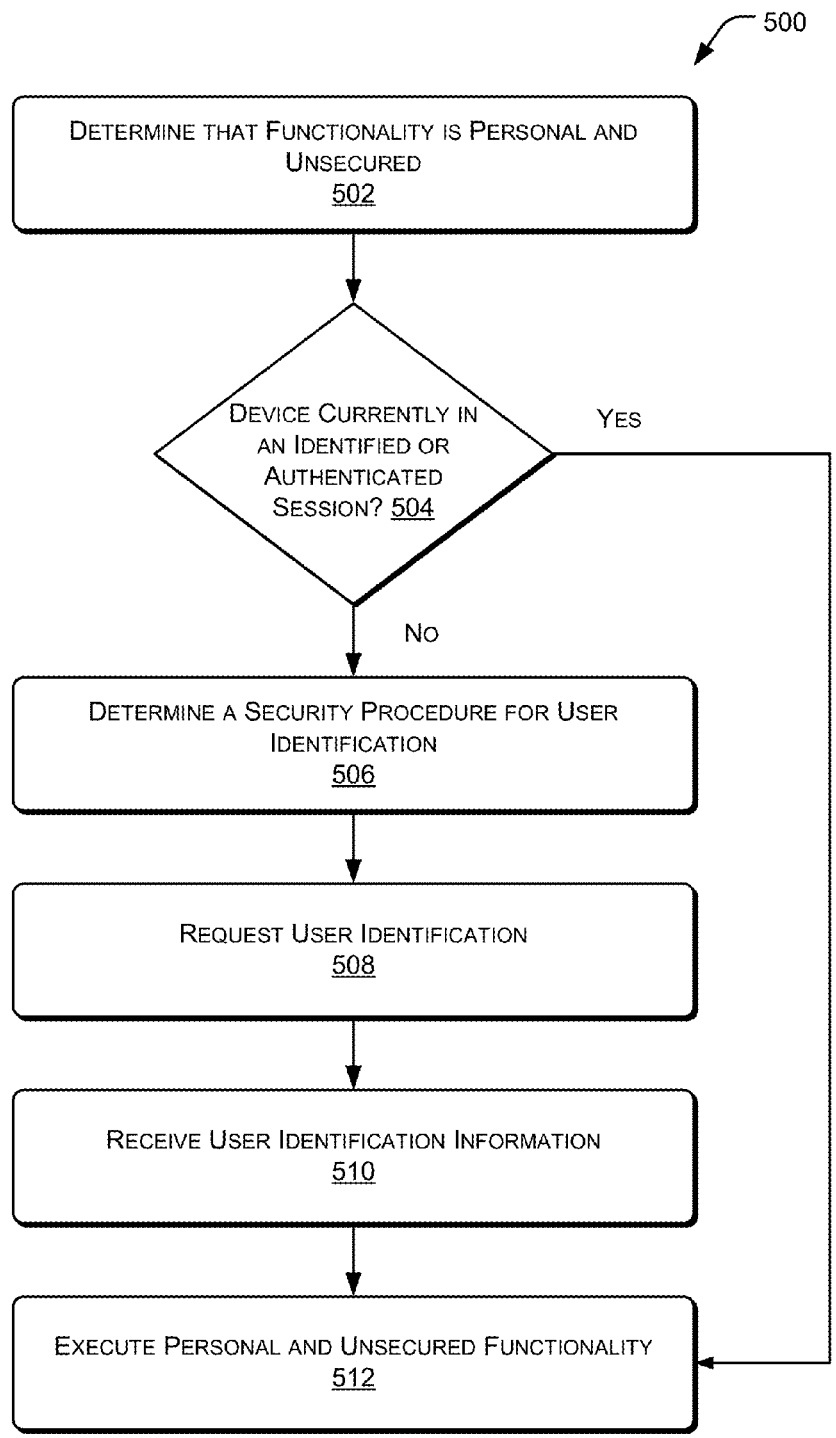
FIG. 5 shows an example process that determines when user identification is required as a security requirement.

FIG. 5 shows an example process 500 for satisfying an identity security requirement based on the functionality requested by a user. The process 500 may be implemented by the security requirements module 108 of the voice controlled device 100 of FIG. 1, the security requirements module 108 of server(s) 210 of FIG. 2, or by other devices.

At 502, the security requirements module 108 determines that the functionality requested by a user is personal to a user and that the functionality requested by the user is unsecured. Again, the security requirements module 108 may access information stored in the user profiles 134 and/or information associated with the applications 118 to determine whether the functionality requested is personal or secured.

At 504, the security requirements module 108 determines whether the voice controlled device 100 is currently engaged in a session where the user has already been identified or the user has already been authenticated. For example, a user may request two different types of functionality within a short period of time and the first requested functionality may require user identification or user authentication. Upon satisfying the security requirements that identify or authenticate the user for the first request, the voice controlled device 100 may initiate a timer and start a session (e.g., an exclusive session) where the voice controlled device 100 is configured to allow the user to make more than one request. Accordingly, the voice controlled device 100 may assume that the user is the same during the session.

In various embodiments, the session may be configured to be a timed session that expires after a pre-determined period has elapsed. The pre-determined period of time may be defined in the settings 136, and the pre-determined period of time may vary depending on multiple different factors. For example, the pre-determined period of time may vary depending on whether the user has been identified compared to authenticated, the security level 138 satisfied for authentication, the type of functionality being performed by the voice controlled device 100 or the application performing the functionality (e.g., developer restrictions), the individual user that has requested the functionality, etc. In other embodiments, the session may be configured to allow a pre-determined number of requests (e.g., one request, two requests, three requests, etc.) before ending the session. Similarly, this type of session and the number of requests allowed may depend on different factors. In an event a session has ended (e.g., timed-out or performed the necessary functionality/requests), the voice controlled device 100 may return to a default configuration (e.g., unrecognized mode), and the user will be required to identify or authenticate himself or herself again.

If the determination at operation 504 is "yes" (e.g., the user has already been identified or authenticated), the process proceeds to operation 512 where the voice controlled device 100 may execute the personal and unsecured functionality (e.g., in the recognized mode or authenticated mode). Note that the voice controlled device 100 may perform personal but unsecured functionality for the user if the user has been authenticated because user authentication is a stricter security requirement compared to user identification.

If the determination at operation at 504 is "no" (e.g., the functionality request is the user's first request or any previous requests by the user did not require identification or authentication as security requirements), then the process proceeds to operation 506 where the security requirements module 108 may access the user profiles 134 to determine a security procedure 142 to identify the user. For example, the security procedure 142 may instruct that the voice controlled device to audibly ask the user for a name.

At 508, the security requirements module 108 may request user identification in accordance with the security procedure 142 determined.

At 510, the security requirements module 108 receives user identification information. In various embodiments, the voice controlled device 100 may be configured to perform operations 508 and 510 by prompting the user for the identification information. Accordingly, the voice controlled device may audibly ask the user to state a name or other registered identifier. The voice controlled device 100 may issue the prompt when the user fails to provide the identification information when requesting the functionality (e.g., examples (iv) and (v) provided above where the user requests functionality but fails to provide identification information). In response to the prompt, the security requirements module 108 may receive the identification information by receiving an answer indicating that "this is John," for example. In an alternative embodiment, the user may proactively provide the identification information along with the requested functionality (e.g., example (iii) provided above where the user states his name is John before requesting the functionality).

In at least one alternative embodiment, the voice controlled device 100 may identify the user by recognizing the voice of the user using a stored voiceprint-based form of identification, as discussed above (e.g., the voiceprint may be indicated in the security procedures 142).

At 512, the security requirements module 108 determines that the user identification security requirements have been satisfied and executes the personal and unsecured functionality. Examples (iii), (iv) and unsecured and non-confidential appointments or reminders of example (v) provided above are functionality that may be executed in the recognized mode (or the authenticated mode) because "my Christmas music playlist," "the up-to-date quotes for the stocks I own," and "my schedule today," each indicate that the requests are personal to the user requesting the functionality, and in most instances this information is not secured.

Figure 6:
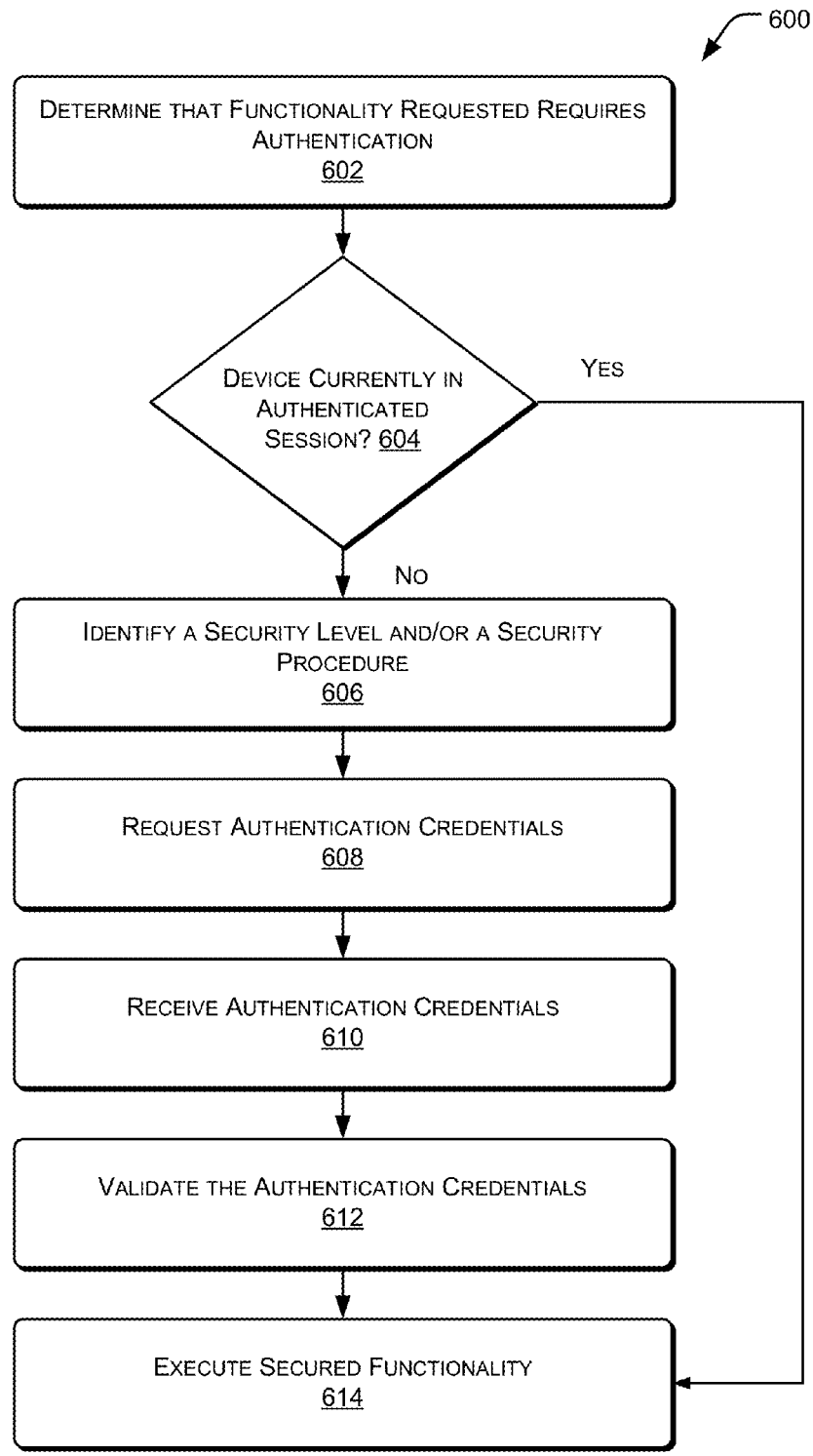
FIG. 6 shows an example process that determines when user authentication is required as a security requirement.

FIG. 6 shows an example process 600 for satisfying an authentication security requirement based on the functionality requested by a user. The process 600 may be implemented by the security requirements module 108 of the voice controlled device 100 of FIG. 1, the security requirements module 108 of server(s) 210 of FIG. 2, or by other devices.

At 602, the security requirements module 108 determines that the functionality requested requires authentication. In various embodiments, the security requirements module 108 may determine that the functionality is secured functionality by accessing information stored in the user profiles 134 and/or application information from one or more applications configured to perform the functionality. For example, the security requirements module 108 may determine that the functionality involves confidential information. In another example, the security requirements module 108 may determine that the functionality is restricted for the user in accordance with one or more defined settings 136.

At 604, the security requirements module 108 determines whether the voice controlled device 100 is currently engaged in a session where the user has already been authenticated (e.g., a non-expired session). In various embodiments, a length of an authenticated session may be a shorter period of time compared to a length of an identification session due to the nature of the operations and/or the information involved. Moreover, the length of an authentication session may vary based on a security level 138 the user must satisfy and the type of functionality being performed.

If the determination at operation 604 is "yes" (e.g., the user has already been authenticated), the process proceeds to operation 614 where the voice controlled device 100 may execute the secured functionality in the current session (e.g., in the authenticated mode).

If the determination at operation at 604 is "no" (e.g., the functionality request is the user's first request or any previous requests by the user did not require authentication as security requirements and thus the voice controlled device 100 may be operating in the unrecognized or recognized mode), then the process proceeds to operation 606 where the security requirements module 108 may access the user profiles 134 to determine a security level 138 and/or a security procedure 142 to so the user can satisfy the authentication security requirements. For example, depending on the type of functionality requested, an application or a primary account holder may define different security levels that provide varying degrees of protection. For example, some secured functionality may be associated with minimal protection (e.g., a four digit personal authentication code spoken out loud), while other secured functionality may be associated with more stringent protection (e.g., a four digit personal authentication code plus a time-sensitive redemption code provided to the personal device 222 of the user).

At 608, the voice controlled device 100 requests authentication credentials from the user in accordance with the security procedure. At 610, the voice controlled device 100 receives the authentication credentials 140. In at least one embodiment, the voice controlled device 100 may be configured to prompt the user for the authentication credentials 140 by asking the user for the authentication credentials 140 (e.g., audibly or electronically). The user may then respond by providing the authentication credentials 140 (e.g., audibly or electronically) via the security procedure used.

At 612, the security requirements module 108 validates the user by verifying that the authentication credentials 140 received from the user match the authentication credentials 140 in the user profile 134. As previously discussed above, the authentication credentials 140 may include, but are not limited to, personal passwords, codes, personal identification numbers ("PIN"), question/answer combinations (e.g., maiden name, favorite childhood pet, etc.), redemption codes (e.g., defined or randomly generated), key fob, a series of tones, or any type of security mechanism used to authenticate individual users. Moreover, the authentication credentials 140 may be user-defined or randomly generated by the voice controlled device 100.

At 614, the voice controlled device 100 performs the secured functionality requested by the user. The secured and/or confidential appointments or reminders of example (v) provided above, as well as example (vi) may be functionality that is configured to involve user authentication as a security requirement because a user may want some appointments and reminders to be secret and/or protected and account holders may not want anyone (e.g., a guest) to be able to make purchases on an account (e.g., want to ensure that only registered users can make purchases).

In various embodiments, the user can also instruct the voice controlled device 100 to end the session before the session is automatically terminated by the voice controlled device 100 (e.g., after a timeout period has elapsed). By ending or terminating a session, the voice controlled device 100 may not be susceptible to executing secured functionality for a non-validated user. This scenario may occur when a first user is validated and then exits the environment where the voice controlled device 100 operates, and a second user then requests secured functionality and the voice controlled device 100 executes the secured functionality thinking the second user is the first user.

Figure 7:
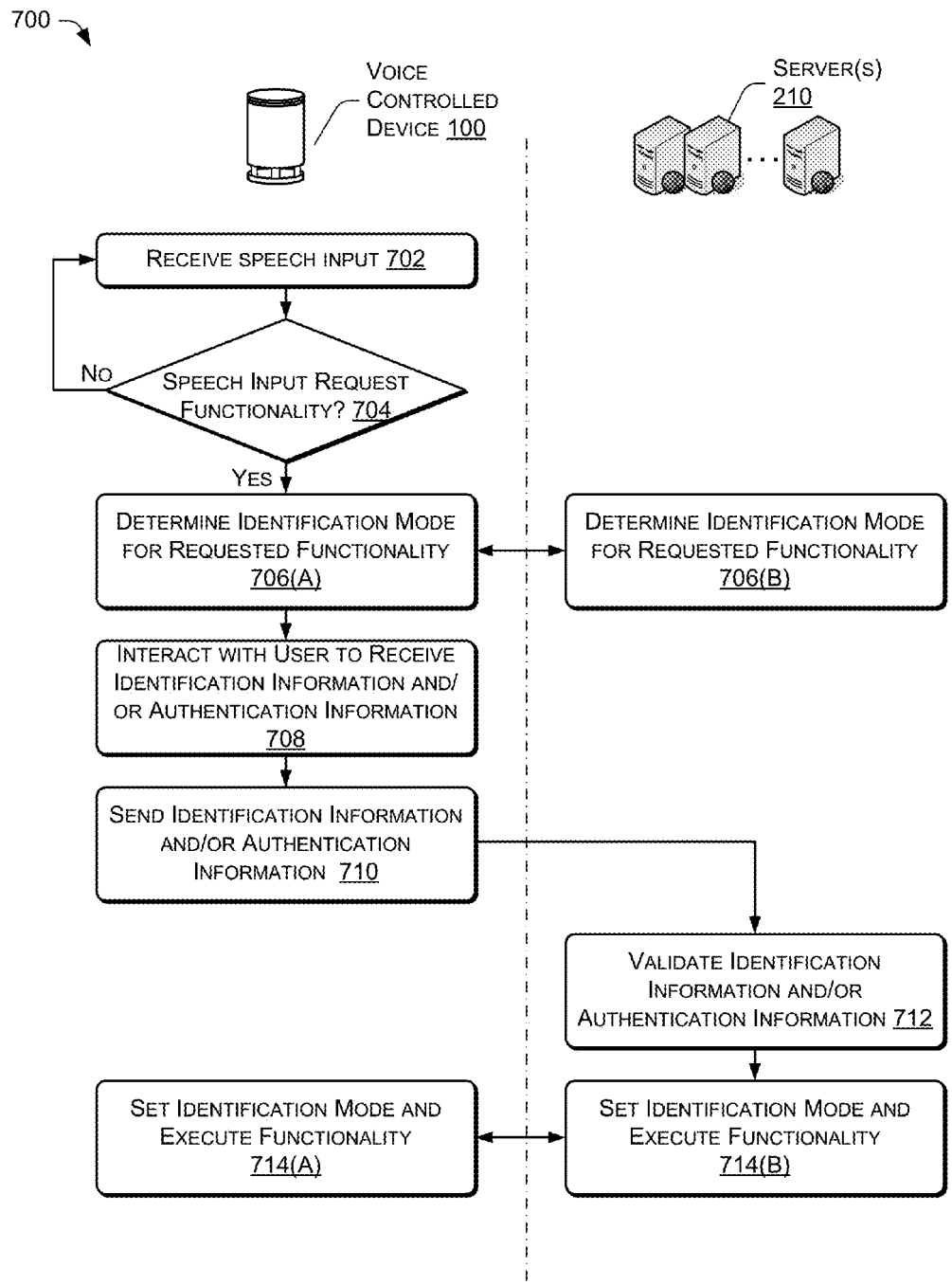
FIG. 7 shows an example interaction process for how security requirements for functionality are requested by a user.

FIG. 7 shows an example interaction process 700. The blocks are arranged visually in FIG. 7 in columns beneath the voice controlled device 100 and the server(s) 210 to illustrate that these devices may perform these operations. That is, actions defined by blocks arranged beneath the voice controlled device 100 may be performed by the voice controlled device 100, and similarly, actions defined by blocks arranged beneath the server(s) 210 may be performed by one or more server(s) 210.

At 702, the voice controlled device 100 located in an environment with a user receives speech input. For examples, the voice controlled device may employ the microphones 150 to receive the speech input.

At 704, the voice controlled device 100 determines if the speech input requests functionality to be performed by the applications 118. For example, the voice controlled device 100 may employ the speech recognition module 116 and/or the security requirements module 108 to determine if the input requests functionality.

If the determination at 704 is "no", then the voice controlled device returns to a state where it waits for further speech input. If the determination at 704 is "yes", then at 706(A) and/or 706(B), the security requirements module 108 determines security requirements for the requested functionality. As depicted, this may occur at the voice controlled device 100 at 706(A), the servers 210 at 706(B), or a combination thereof.

At 708, the voice controlled device 100 interacts with the user to receive identification information when identification is required as a security requirement or to receive authentication information when authentication is required as a security requirement.

At 710, the voice controlled device 100 may send the identification information and/or the authenticated information received from the user to the servers 210.

At 712, the servers 210 may validate the identification information and/or authentication information so that the appropriate or proper functionality can be executed.

At 714(A) and 714(B), the security requirements module 108 executes the functionality for the user. As depicted, this may occur at the voice controlled device 100 at 714(A), the servers 210 at 714(B), or a combination thereof.

The technique described above and illustrated in FIG. 7 is merely an example and implementations are not limited to this technique. Rather, other techniques for determining the security requirements that must be satisfied for requested functionality and/or operating modes for the device 100 and system architecture 200 may be employed and the implementations of the system disclosed herein are not limited to any particular technique.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing system comprising:
one or more processors;
at least one microphone to receive a plurality of audio inputs from a user, the plurality of audio inputs comprising a first audio input, a second audio input, and a third audio input;
one or more computer-readable storage media storing computer-executable instructions;
a speech processing module maintained in the one or more computer-readable storage media and executed by the one or more processors to:
obtain first speech recognition results from a first signal representing the first audio input;
obtain second speech recognition results from a second signal representing the second audio input;

obtain third speech recognition results from a third signal representing the third audio input;
determine a first requested functionality associated with the first speech recognition results;
determine a second requested functionality associated with the second speech recognition results; and
determine a third requested functionality associated with the third speech recognition results;
a security requirements module maintained in the one or more computer-readable storage media and executed by the one or more processors to:
determine that there are no security requirements for the first requested functionality;
determine an identification security requirement for the second requested functionality;
determine an authentication security requirement for the third requested functionality;
determine that the identification security requirement is satisfied using identification information received from the user; and
determine that the authentication security requirement is satisfied using authentication information received from the user; and
an application module maintained in the one or more computer-readable storage media and executed by the one or more processors to execute the first requested functionality, the second requested functionality, and the third requested functionality.

2. The computing system as recited in claim 1, wherein the first requested functionality is one of playing music, playing a movie, setting a timer, requesting information about the weather, or requesting publicly available information from a web page.

3. The computing system as recited in claim 1, wherein the identification information received from the user comprises audio input comprising the user's name and wherein the second requested functionality is one of playing music from a playlist of the user, setting a reminder for the user, requesting information from a calendar of the user, or requesting information about email sent to the user.

4. The computing system as recited in claim 1, wherein the authentication information received from the user comprises audio input comprising a password and wherein the third requested functionality is one of requesting information about a bank account, purchasing an item, or sending an email message.

5. The computing system as recited in claim 1, wherein the security requirements module is further executed by the one or more processors to access user security settings, the user security settings being stored in a user profile for the user.

6. The computing system as recited in claim 1, wherein the security requirements module is further executed by the one or more processors to access application security settings associated with an application.

7. A method comprising:
receiving, at a computing device, a signal comprising speech input of a user;
determining a requested functionality from the speech input using at least one of speech recognition and natural language understanding;
determining a security requirement associated with the requested functionality;
determining that the security requirement is satisfied; and
performing the requested functionality.

8. The method as recited in claim 7, wherein the security requirement is that any user may execute the requested functionality.

9. The method as recited in claim 7, wherein the security requirement comprises user identification and wherein determining that the security requirement is satisfied comprises receiving identification information from the user.

10. The method as recited in claim 9, wherein the identification information comprises at least one of the speech input, additional speech input received at the computing device, identity data, behavior data, usage patterns, or biometric data.

11. The method as recited in claim 9, further comprising:
requesting the identification information;
receiving the identification information; and
validating the identification information.

12. The method as recited in claim 7, wherein the security requirement requires user authentication and wherein determining that the security requirement is satisfied comprises receiving authentication information from the user.

13. The method as recited in claim 12, further comprising:
requesting the authentication information;
receiving the authentication information; and
validating the authentication information.

14. The method as recited in claim 12, wherein the authentication information is received electronically from a device associated with the user.

15. The method as recited in claim 7, wherein determining that the security requirement is satisfied comprises determining that the security requirement was previously satisfied within a pre-defined amount of time.

16. The method as recited in claim 7, further comprising accessing user security settings, the user security settings being stored in a user profile for the user.

17. The method as recited in claim 7, further comprising accessing application security settings associated with an application.

18. One or more non-transitory computer-readable media having computer-executable instructions that, when executed by one or more processors, cause the one or more processors to perform operations comprising:
receiving a signal comprising speech input of a user, the user being one of a plurality of users registered at a device;
determining a requested functionality from the speech input using at least one of speech recognition and natural language understanding;
determining that the requested functionality involves a security requirement;
determining that the user has satisfied the security requirement; and
executing the requested functionality after the user has satisfied the security requirement.

19. The one or more non-transitory computer-readable media as recited in claim 18, wherein the security requirement is that any of the plurality of users may execute the requested functionality.

20. The one or more non-transitory computer-readable media as recited in claim 18, wherein the security requirement comprises user identification and wherein determining that the user has satisfied the security requirement comprises audibly receiving a name of the user.

21. The one or more non-transitory computer-readable media as recited in claim 18, wherein the security requirement comprises user authentication and wherein determining that the user has satisfied the security requirement comprises receiving authentication credentials from the user and validating the authentication credentials.

22. One or more non-transitory computer-readable media having computer-executable instructions that, when executed by one or more processors, cause the one or more processors to perform operations comprising:
- receiving a first signal comprising speech input from a user;
- determining a requested functionality from the speech input using at least one of speech recognition and natural language understanding;
- determining that the requested functionality requires user authentication as a security requirement before execution;
- requesting that the user provide one or more authentication credentials;
- receiving a second signal corresponding to the one or more authentication credentials;
- determining that the one or more authentication credential satisfy the security requirement; and
- executing the requested functionality.

23. The one or more non-transitory computer-readable media as recited in claim 22, wherein the one or more authentication credentials are requested audibly and the second signal is received audibly.

24. The one or more non-transitory computer-readable media as recited in claim 22, wherein the one or more authentication credentials are requested audibly by a first electronic device and the second signal is received from a second electronic device associated with the user.

25. A method comprising:
- operating a voice-controlled device in a first mode that executes a first function independent of user identification and user authentication;
- receiving a request to perform a second function;
- determining that the second function requires user identification or user authentication;
- switching operation of the voice-controlled device from a first mode to a second mode that involves user identification or user authentication as a security requirement;
- accessing information that identifies or authenticates a user that provides the request;
- creating a session for the user, wherein the second function is executed during the session;
- terminating the session after a pre-determined period of time; and
- switching operation of the voice-controlled device from the second mode to the first mode after the session is terminated.

26. The method of claim 25, wherein the first mode is an unrecognized mode in which the voice-controlled device executes non-personal and unsecured functionality common to a plurality of different users.

27. The method of claim 25, wherein the second mode is a recognized mode that requires user identification and the second function is personal to the user.

28. The method of claim 25, wherein the second mode is an authenticated mode that requires user authentication and the second function includes secured operations or secured information.

* * * * *